US009576345B2

(12) United States Patent
Mailhe et al.

(10) Patent No.: US 9,576,345 B2
(45) Date of Patent: Feb. 21, 2017

(54) SIMULTANEOUS EDGE ENHANCEMENT AND NON-UNIFORM NOISE REMOVAL USING REFINED ADAPTIVE FILTERING

(71) Applicant: Siemens Aktiengesellschaft, Munich (DE)

(72) Inventors: Boris Mailhe, Plainsboro, NJ (US); Stephan Kannengiesser, Wuppertal (DE)

(73) Assignee: Siemens Healthcare GmbH, Erlangen (DE)

( * ) Notice: Subject to any disclaimer, the term of this patent is extended or adjusted under 35 U.S.C. 154(b) by 3 days.

(21) Appl. No.: 14/630,027

(22) Filed: Feb. 24, 2015

(65) Prior Publication Data
US 2016/0247263 A1    Aug. 25, 2016

(51) Int. Cl.
*G06K 9/00* (2006.01)
*G06T 5/00* (2006.01)
*G06T 5/20* (2006.01)

(52) U.S. Cl.
CPC .............. *G06T 5/002* (2013.01); *G06T 5/003* (2013.01); *G06T 5/20* (2013.01); *G06T 2207/10088* (2013.01); *G06T 2207/20004* (2013.01); *G06T 2207/20024* (2013.01); *G06T 2207/20182* (2013.01); *G06T 2207/20192* (2013.01); *G06T 2207/30056* (2013.01)

(58) Field of Classification Search
CPC .......................................... G06T 2207/20182
See application file for complete search history.

(56) References Cited

U.S. PATENT DOCUMENTS

| | | | | |
|---|---|---|---|---|
| 2008/0247618 A1* | 10/2008 | Laine | .................... | G06F 19/321 382/128 |
| 2008/0310695 A1* | 12/2008 | Garnier | .................. | G06T 5/002 382/131 |
| 2009/0285463 A1* | 11/2009 | Otazo | .................. | G06T 3/4053 382/131 |
| 2013/0077893 A1* | 3/2013 | Moon | .................... | G06T 5/002 382/299 |
| 2014/0212015 A1* | 7/2014 | Ding | ........................ | G06T 5/50 382/131 |
| 2014/0219552 A1* | 8/2014 | Porikli | .................... | G06T 5/002 382/155 |

OTHER PUBLICATIONS

Savaji et al. "Denoising of MRI Images using Thresholding Techniques through Wavelet" International Journal of Innovative Science, Engineering & Technology, vol. 1 Issue 7, Sep. 2014.*

* cited by examiner

*Primary Examiner* — Oneal R Mistry

(57) ABSTRACT

A method for denoising magnetic resonance images includes estimating a normalization field corresponding to a magnetic resonance imaging device and acquiring a non-normalized image from the magnetic resonance imaging device. A noise level estimation process is performed with the non-normalized image to yield a noise level. The normalization field is applied to the noise level to yield a potentially inhomogeneous noise-level map and to the non-normalized image to yield a normalized image. An adaptive polynomial filtering process is performed using the normalized image and the potentially inhomogeneous noise-level map to yield a denoised image.

6 Claims, 11 Drawing Sheets

SIMULTANEOUS EDGE ENHANCEMENT AND NON-UNIFORM NOISE REMOVAL USING REFINED ADAPTIVE FILTERING

TECHNOLOGY FIELD

The present invention relates generally to methods, systems, and apparatuses for processing image data to simultaneously enhance edges and provide non-uniform noise removal using refined adaptive filtering. The disclosed methods, systems, and apparatuses may be applied to various magnetic resonance imaging applications including, for example, liver imaging applications.

BACKGROUND

Magnetic resonance images suffer from an intensity inhomogeneity known as a "bias field" caused by the placement of image coils in the scanner. As a result of this bias field, some parts of the acquired image (typically the center) are darker than the rest of the image. To equalize image intensity, a normalization field is typically applied to the image data during post-processing. The normalization field can be estimated in various ways, e.g. from the images themselves, or from pre scan data. However, because this normalization field is applied to the entire image, it increases both the signal and noise of the data. Thus, after normalization, denoising techniques must be applied to the data.

Although conventional denoising techniques exist, they have drawbacks which produce suboptimal results. For example, many conventional techniques are not adaptive to variable noise levels that may be present in normalized image data. As a result, these techniques overly smooth low noise regions. Additionally, the application of conventional techniques over a high number of iterations introduces image blurring which distorts certain anatomical structures such as liver vessels.

SUMMARY

Embodiments of the present invention address and overcome one or more of the above shortcomings and drawbacks, by providing methods, systems, and apparatuses related to image processing techniques providing simultaneous edge enhancement and non-uniform noise removal using refined adaptive filtering. The proposed schemes may be used to improve image quality in various image processing applications.

According to some embodiments, a method for denoising magnetic resonance images includes estimating a normalization field corresponding to a magnetic resonance imaging device and acquiring a non-normalized image from the magnetic resonance imaging device. In one embodiment, this non-normalized image includes complex image data and phase information from the non-normalized image is utilized in the noise level estimation process. A noise level estimation process is performed with the non-normalized image to yield a noise level. The normalization field is applied to the noise level to yield a potentially inhomogeneous noise-level map and to the non-normalized image to yield a normalized image. An adaptive polynomial filtering process is performed using the normalized image and the potentially inhomogeneous noise-level map to yield a denoised image. In some embodiments, the aforementioned method also includes applying an edge enhancement process to the denoised image, wherein the edge enhancement process is configured based on a predetermined edge enhancement level tuned to maximize perceived image quality.

The implementation of the noise level estimation process used in the aforementioned method may vary in different embodiments. For example, in some embodiments, the noise level estimation process applies a median absolute deviation estimator in a wavelet domain to the yield the potentially inhomogeneous noise-level map. In some embodiments, the noise level estimation process includes selecting a region of interest based on the normalization field and applying a high-pass filter (e.g., a HH wavelet transform) to the non-normalized image using the region of interest to yield a filtered image. A median absolute deviation of the filtered image may then be determined and a noise distribution scaling factor (e.g., corresponding to Gaussian distribution) may be applied to the median absolute deviation to yield a homogeneous noise level value. The potentially inhomogeneous noise-level map may then be determined based on the homogeneous noise level value and the normalization field.

The implementation of the adaptive polynomial filtering process used in the aforementioned method may also vary in different embodiments. For example in one embodiment, the adaptive polynomial filtering process includes computing a base filter using the normalized image and the potentially inhomogeneous noise-level map. This base filter may be, for example, a bilateral filter that is adaptive to local noise level. Once computed, the base filter may be iteratively applied to the normalized image to yield the denoised image. In one embodiment, denoised image is combined with polynomial filter design coefficients during each application of the base filter to the normalized image. In one embodiment, the polynomial filter design coefficients are pre-computed to optimize denoising and edge preservation performance.

According to other embodiments, a second method for denoising magnetic resonance images includes acquiring complex image data from a magnetic resonance imaging device. This complex image data may include, for example, a multi-echo data set and the region of interest corresponds to portions of the complex image data having echoes with constructive interferences between water and fat responses. An inhomogeneous noise-level map representative of an estimated noise level in the complex image data is generated. The inhomogeneous noise-level map and the complex image data are used to compute an adaptive denoising filter (e.g., a bilateral filter that is adaptive to local noise level). The adaptive denoising filter is iteratively applied to the complex image data and the iterates are recombined using polynomial coefficients to yield a denoised image. In some embodiments, this method further includes estimating a normalization field and modulating the inhomogeneous noise-level map by the normalization field prior to applying the adaptive denoising filter to the complex image data. In some embodiments, an edge enhancement process (e.g., configured based on a predetermined edge enhancement level tuned to maximize perceived image quality) may be applied to the denoised image as part of the method.

Various techniques may be used for generating the inhomogeneous noise-level map in the aforementioned second method for denoising magnetic resonance images. For example, in one embodiment, the inhomogeneous noise-level map is generated by a process which includes selecting a region of interest within the complex image data. In some embodiments, this region of interest is selected based on the normalization field. In one embodiment, a region of interest comprises a region of the complex image data corresponding to signal-to-noise ratio values below a threshold value. Once the region of interest is selected, it is used in applying a high-pass filter to the complex image data to yield filtered image data. A median absolute deviation of the filtered image data is determined and a noise distribution scaling factor is applied to the median absolute deviation to yield a homogeneous noise level value. The inhomogeneous noise-level map may then be determined based on the homogeneous noise level value and the normalization field.

According to another embodiment, a system for denoising magnetic resonance images includes a plurality of magnetic resonance coils and an imaging computer. The magnetic resonance coils are configured to acquire a non-normalized image of a subject. The imaging computer is configured to estimate a normalization field corresponding to a magnetic resonance imaging device corresponding to the plurality of magnetic resonance coils; perform a noise level estimation process with the non-normalized image to yield a noise level; apply the normalization field to the noise level to yield a potentially inhomogeneous noise-level map; apply the normalization field to the non-normalized image to yield a normalized image; perform an adaptive polynomial filtering process using the normalized image and the potentially inhomogeneous noise-level map to yield a denoised image.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

Figure 1:
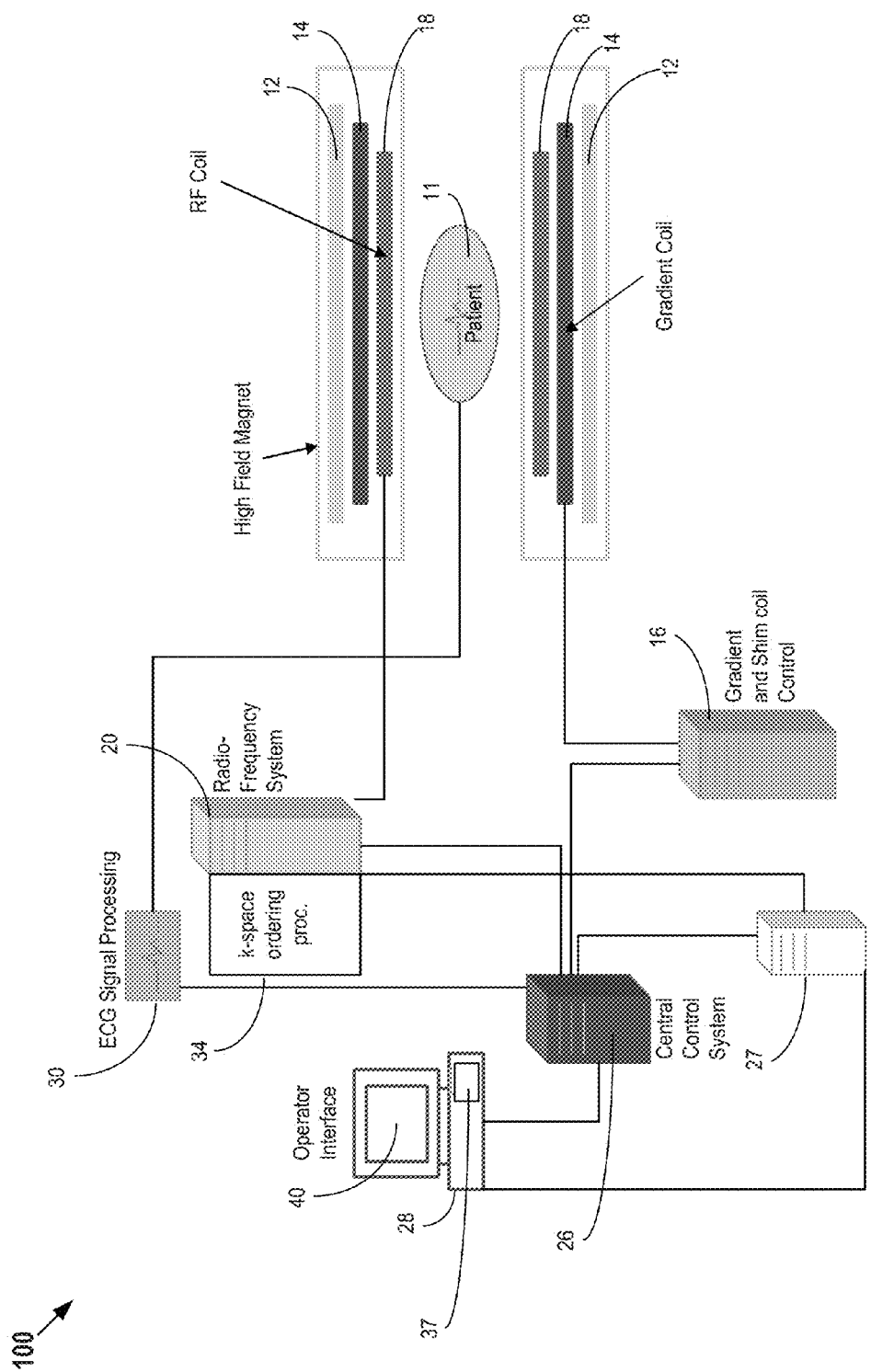
FIG. 1 shows a system for ordering acquisition of frequency domain components representing MR image data for storage in a k-space storage array, as used by some embodiments of the present invention.

The following disclosure describes the present invention according to several embodiments directed at methods, systems, and apparatuses for non-uniform noise removal using refined adaptive filtering techniques. The techniques described herein provide several benefits over conventional noise removal technologies. For example, the techniques are adaptive to inhomogeneous noise levels and can provide edge preservation independent of the number of iterations. Also, the technique may improve texture preservation in the resulting images. The various methods, systems, and apparatuses are especially applicable to the denoising of magnetic resonance imaging data. However, it should be understood that the techniques described herein may be generally applied to the denoising of various types of images FIG. 1 shows a system 100 for ordering acquisition of frequency domain components representing magnetic resonance (MR) image data for storage in a k-space storage array, as used by some embodiments of the present invention. In system 100, magnetic coils 12 create a static base magnetic field in the body of patient 11 to be imaged and positioned on a table. Within the magnet system are gradient coils 14 for producing position dependent magnetic field gradients superimposed on the static magnetic field. Gradient coils 14, in response to gradient signals supplied thereto by a gradient and shim coil control module 16, produce position dependent and shimmed magnetic field gradients in three orthogonal directions and generates magnetic field pulse sequences. The shimmed gradients compensate for inhomogeneity and variability in an MR imaging device magnetic field resulting from patient anatomical variation and other sources. The magnetic field gradients include a slice-selection gradient magnetic field, a phase-encoding gradient magnetic field and a readout gradient magnetic field that are applied to patient 11.

Further radio frequency (RF) module 20 provides RF pulse signals to RF coil 18, which in response produces magnetic field pulses which rotate the spins of the protons in the imaged body of the patient 11 by ninety degrees or by one hundred and eighty degrees for so-called "spin echo" imaging, or by angles less than or equal to 90 degrees for so-called "gradient echo" imaging. Gradient and shim coil control module 16 in conjunction with RF module 20, as directed by central control unit 26, control slice-selection, phase-encoding, readout gradient magnetic fields, radio frequency transmission, and magnetic resonance signal detection, to acquire magnetic resonance signals representing planar slices of patient 11.

In response to applied RF pulse signals, the RF coil 18 receives MR signals, i.e., signals from the excited protons within the body as they return to an equilibrium position established by the static and gradient magnetic fields. The MR signals are detected and processed by a detector within RF module 20 and k-space component processor unit 34 to provide an MR dataset to an image data processor for processing into an image. In some embodiments, the image data processor is located in central control unit 26. However, in other embodiments such as the one depicted in FIG. 1, the image data processor is located in a separate unit 27. ECG synchronization signal generator 30 provides ECG signals used for pulse sequence and imaging synchronization. A two or three dimensional k-space storage array of individual data elements in k-space component processor unit 34 stores corresponding individual frequency components comprising an MR dataset. The k-space array of individual data elements has a designated center and individual data elements individually have a radius to the designated center.

A magnetic field generator (comprising coils 12, 14 and 18) generates a magnetic field for use in acquiring multiple individual frequency components corresponding to individual data elements in the storage array. The individual frequency components are successively acquired in an order in which radius of respective corresponding individual data elements increases and decreases along a substantially spiral path as the multiple individual frequency components is sequentially acquired during acquisition of an MR dataset representing an MR image. A storage processor in the k-space component processor unit 34 stores individual frequency components acquired using the magnetic field in corresponding individual data elements in the array. The radius of respective corresponding individual data elements alternately increases and decreases as multiple sequential individual frequency components are acquired. The magnetic field acquires individual frequency components in an order corresponding to a sequence of substantially adjacent individual data elements in the array and magnetic field gradient change between successively acquired frequency components is substantially minimized.

Central control unit 26 uses information stored in an internal database to process the detected MR signals in a coordinated manner to generate high quality images of a selected slice(s) of the body (e.g., using the image data processor) and adjusts other parameters of system 100. The stored information comprises predetermined pulse sequence and magnetic field gradient and strength data as well as data indicating timing, orientation and spatial volume of gradient magnetic fields to be applied in imaging. Generated images are presented on display 40 of the operator interface. Computer 28 of the operator interface includes a graphical user interface (GUI) enabling user interaction with central control unit 26 and enables user modification of magnetic resonance imaging signals in substantially real time. Display processor 37 processes the magnetic resonance signals to provide image representative data for display on display 40, for example.

Using techniques described herein, the system 100 illustrated in FIG. 1 may be applied to implement a denoising technique which includes a noise level estimation process and an adaptive filtering process. These processes are discussed in greater detail below with respect to FIGS. 2 and 3.

Figure 2:
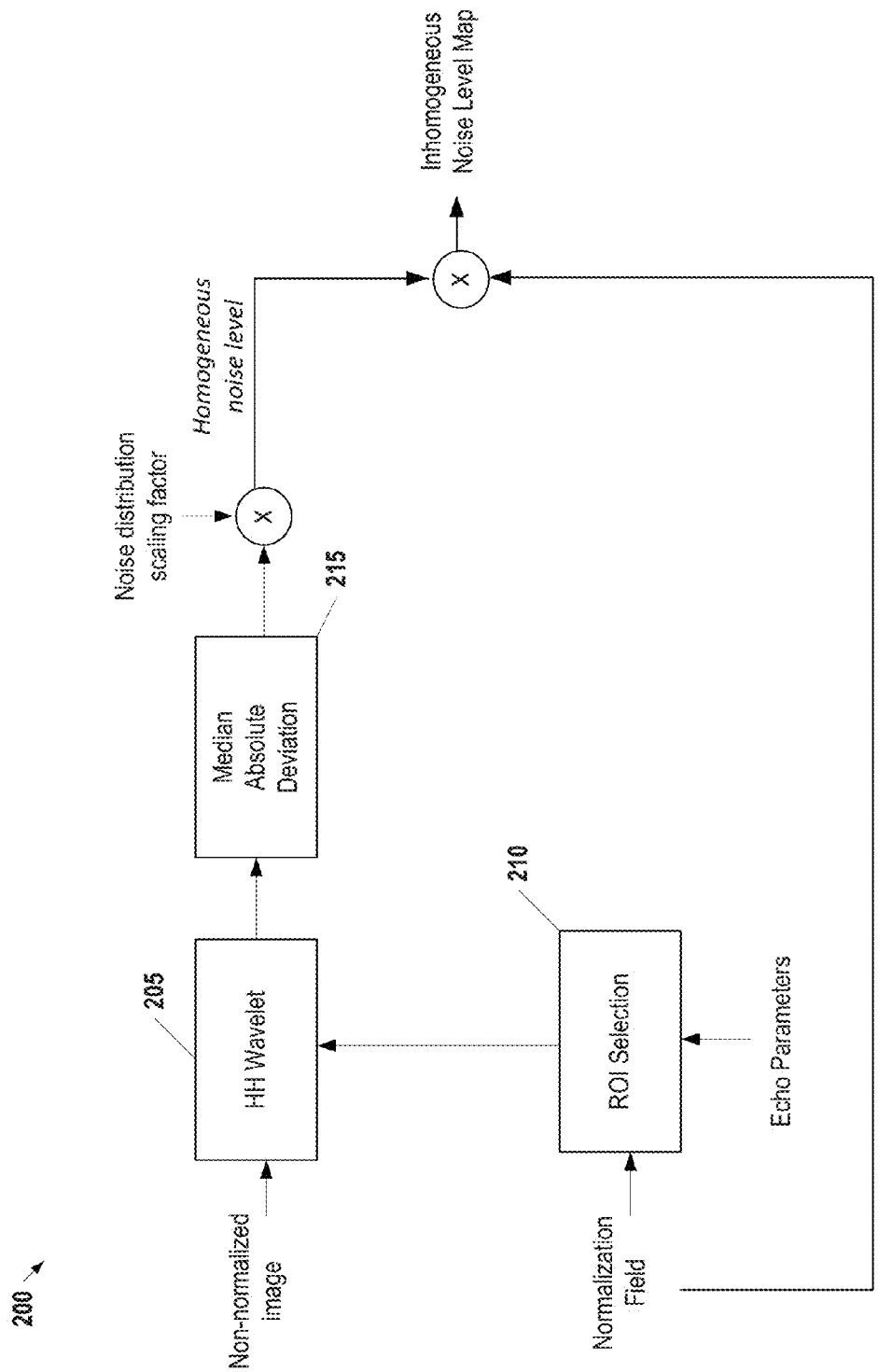
FIG. 2 provides an illustration of a noise level estimation process, according to some embodiments of the present invention.

FIG. 2 provides an illustration of a noise level estimation process 200, according to some embodiments of the present invention. In this example, the inhomogeneous noise level in the normalized image may be determined by first estimating the noise level in the non-normalized image (which may be modeled as homogeneous), then modulating it by the normalization field generated by the scanner. The estimated homogeneous noise level is determined using a Median Absolute Deviation (MAD) Estimator in the wavelet domain. In FIG. 2, the estimator is illustrated by a HH Wavelet Transform 205 applied to the non-normalized image, followed by a Median Absolute Deviation (MAD) Measurement 215. To reduce the bias induced the presence of signal in the noise to be measured by the HH Wavelet Transform 205, a region with low signal-to-noise ratio (SNR) is automatically selected by a ROI Selection Component 210 using the normalization field. Following application of the MAD Measurement 215, a scaling factor is applied to the estimated homogeneous noise level. The exact value of the noise distribution scaling factor may be selected based on the probability distribution of the underlying data. For example, in some embodiments, where complex data with a Gaussian distribution is processed, the scaling factor is 1.4826.

Figure 3:
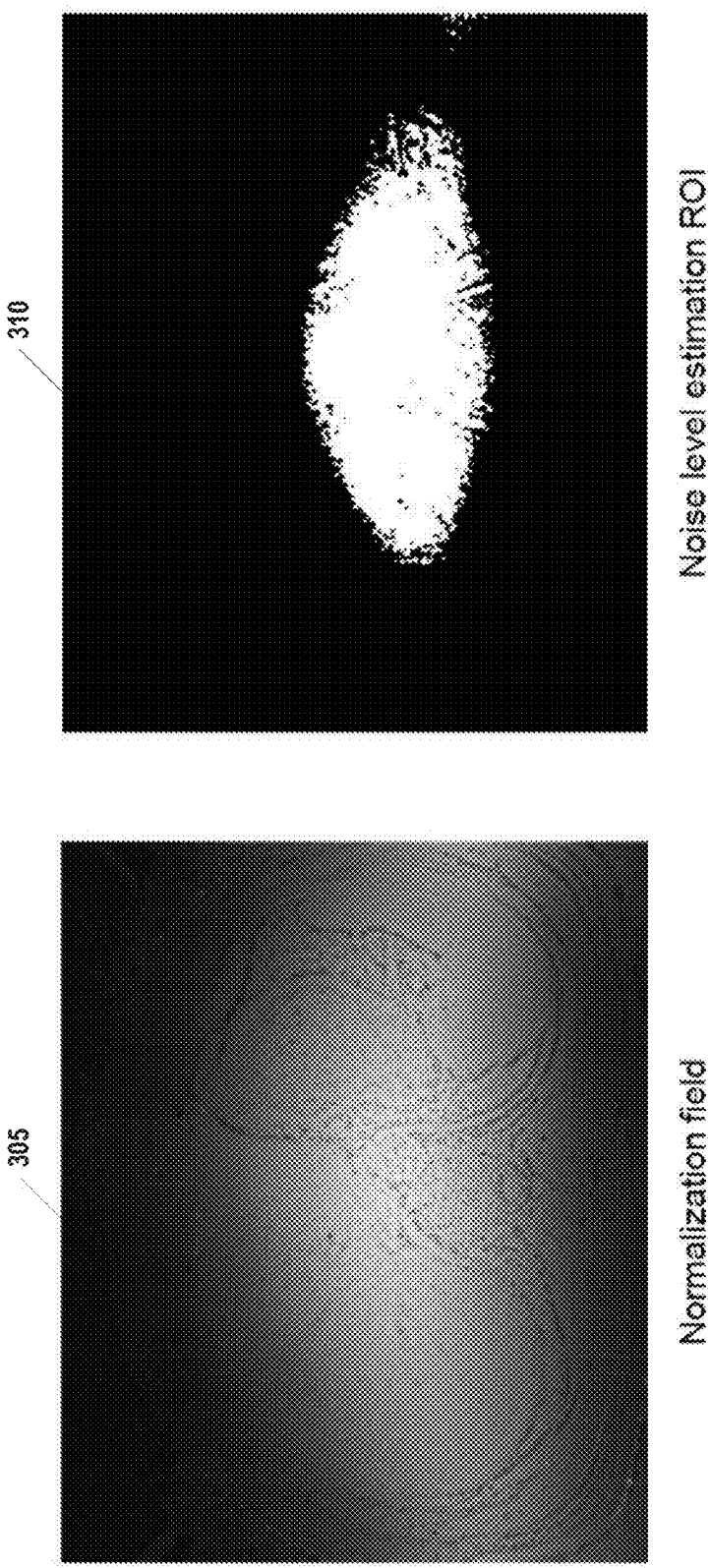
FIG. 3 provides an illustration of a polynomial filtering process, according to some embodiments of the present invention.

FIG. 3 shows a pair of images 305, 310 illustrating data that may be applied during the noise level estimation process 200 described in FIG. 2, according to some embodiments of the present invention. Image 305 shows a normalization field corresponding to a subject's liver. Such a normalization field can be computed using techniques generally known in the art. Once the normalization field is acquired, a region of interest with a low signal-to-noise ratio is selected for noise level estimation. Image 310 shows the noise level estimation region of interest for the normalization field depicted in image 305. This region of interest may then be used during the estimation of the noise level.

Figure 4A:
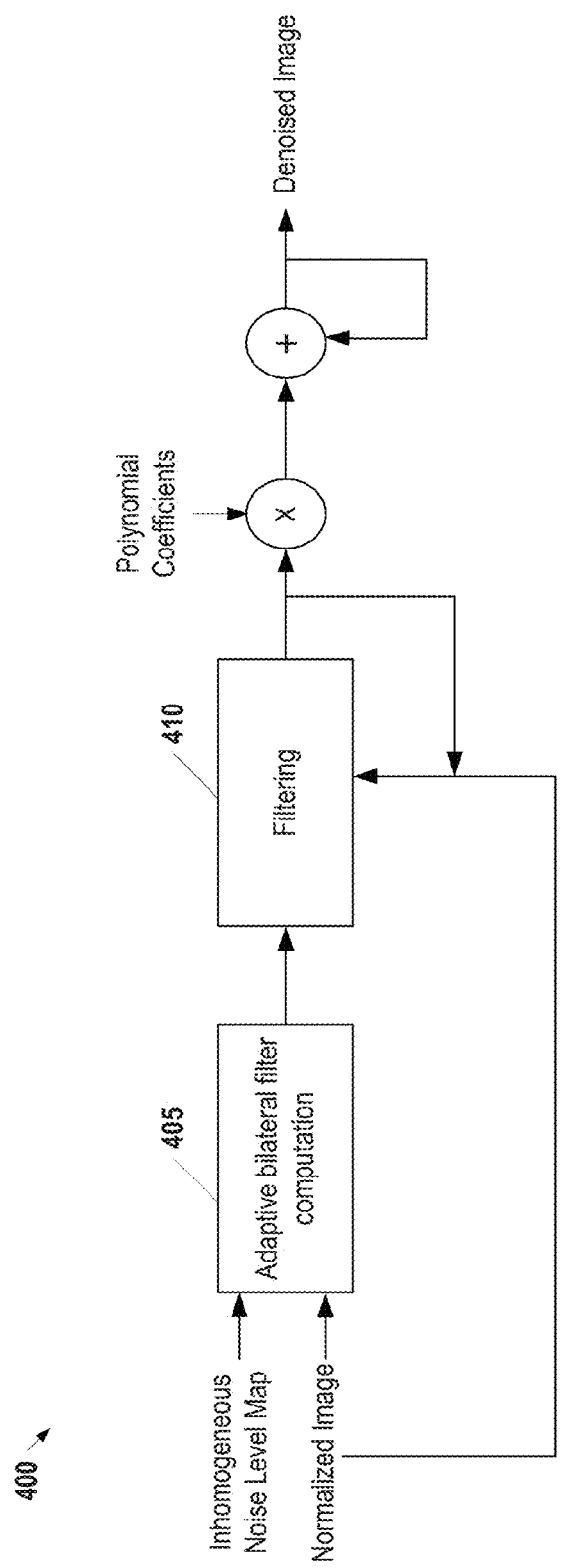
FIG. 4A shows a set of images that demonstrate that relevance of phase information to edge preservation.

FIG. 4A provides an illustration of a polynomial filtering process 400, according to some embodiments of the present invention. The inhomogeneous noise level map (see, e.g., FIG. 2) and a normalized image is used by a Filter Computation Component 405 to determine a base filter designed to both denoise and sharpen image data. In the example of FIG. 4A, this base filter is an adaptive bilateral filter. However, it should be understood that other filter types generally adaptive to noise level may also be used with the techniques described herein such as, without limitation Block-matching and 3D filtering and non-local means filtering.

Various techniques may be used to determine filter that can both denoise and sharpen image data. For example, in some embodiments, the base filter is a 3×3 noise-adaptive bilateral filter where each pixel is estimated by a local average weighted by the proximity of the neighbor's intensities. The filter is a row-stochastic, approximately semi-definite positive (SDP) symmetric, linear operator with a spectrum in [0, 1]. The filter is also image-adaptive, so low eigenvalues should correspond to noise and high ones to the image. One can recombine several iterates of the filter so that low eigenvalues are driven to 0 and high eigenvalues to 1. In one embodiment, a balanced polynomial design is used such that all data below a cutoff eigenvalue value is deemed noise, while everything about that value is treated as signal. Thus, values below the cutoff can be dampened, while values above the cutoff are treated as 1.

Figure 4B:
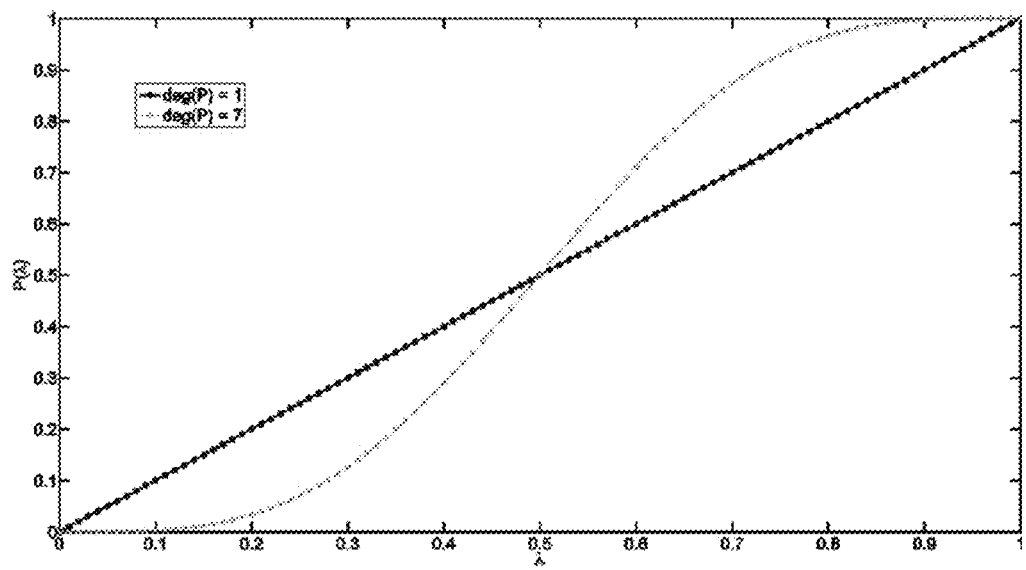
FIG. 4B provides an example of a balanced polynomial design, as used in some embodiments.
Figure 4C:
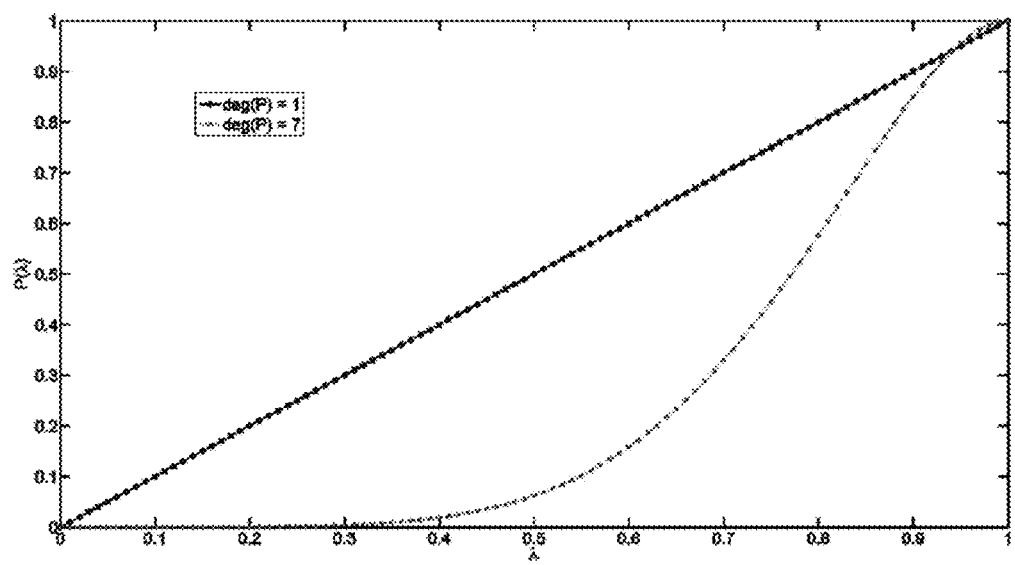
FIG. 4C provides an example of a high-denoising polynomial design, as used in some embodiments.

FIGS. 4B and 4C provide examples of plots of example filtering profiles that may be utilized in some embodiments. FIG. 4B provides an example of a balanced polynomial design where the cutoff is set to ½ and, for a given filter order (i.e., the number of iterations), the filtered results are as flat as possible near 0 and as flat as possible near 1. FIG. 4C provides an example of a high-denoising polynomial design where there is no cut-off value; rather, the goal is to dampen noise as much as possible. Boundary conditions are set to produce a flat curve when values approach 1. For example, the value of the transformed eigenvalue may be set to be 1 at that point, with the derivative of the filter function being 0. It should be noted that, although FIGS. 4B and 4C illustrate their respective designs for two degrees of the polynomial (i.e., 1 and 7), the general concept illustrated by these examples may be extended to a polynomial of any degree.

Returning to FIG. 4A, a Filtering Component 410 iteratively applies the base filter to the normalized image. The polynomial coefficients corresponding to the base filter are used to recombine the different iterates. In the example of FIG. 4A, these coefficients are precomputed to simultaneously improve the denoising and edge preservation performance, for any number of iterations. After filtering, an edge enhancement process (not illustrated in FIG. 4) may be applied to the denoised image. However, note that it is not required for image readability since the base filter may be used to preserve the edges. Thus, the edge enhancement level can be tuned to maximize the perceived quality alone.

Figure 5:
FIG. 5 shows a noisy multi-echo image of a liver.
Figure 6:
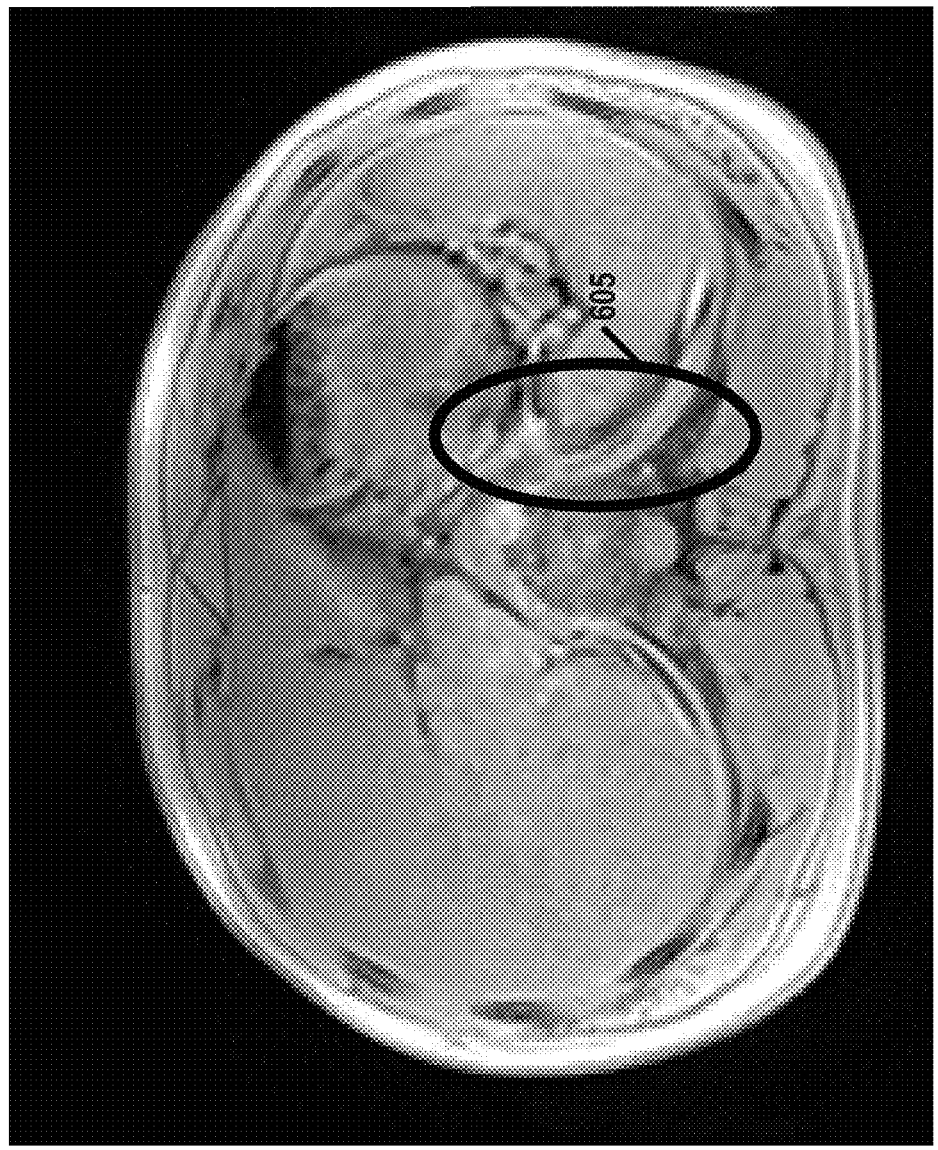
FIG. 6 shows the effect of denoising the image shown in FIG. 5 in magnitude only.
Figure 7:
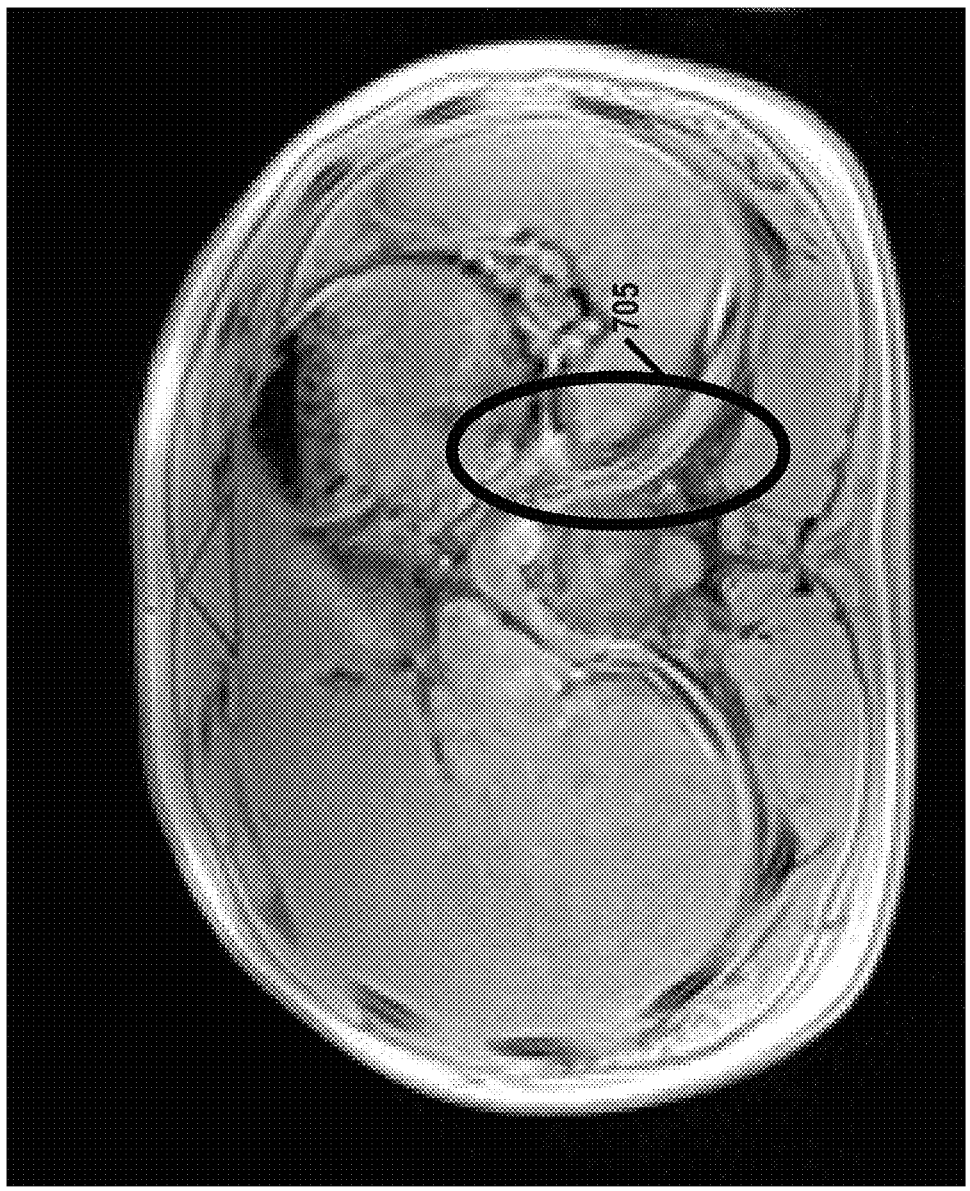
FIG. 7 shows the effect of denoising the complex data of the image shown in FIG. 5.

If complex images are available (e.g., if the denoising is implemented on the scanner), the polynomial filtering process 400 illustrated in FIG. 4A may be performed on the complex images rather than on the magnitude. Since complex-valued pixels belonging to different regions have a higher difference in values than magnitude-valued pixels, this may improve edge preservation. FIGS. 5-7 show a set of images that demonstrate that relevance of phase information to edge preservation. FIG. 5 shows a noisy multi-echo image of a liver. FIG. 6 shows the effect of denoising the image shown in FIG. 5 in magnitude only, while FIG. 7 shows the effect of denoising the complex image data. For both FIGS. 6 and 7, denoising was performed using the techniques described herein. As shown in these images, the denoised complex image (FIG. 7) is much sharper than the denoised magnitude image (FIG. 6). For example, in FIG. 6, Oval 605 highlights some blurred features in the magnitude image. In FIG. 7, Oval 705 shows the same features with sharper edges in the complex image.

Figure 8:
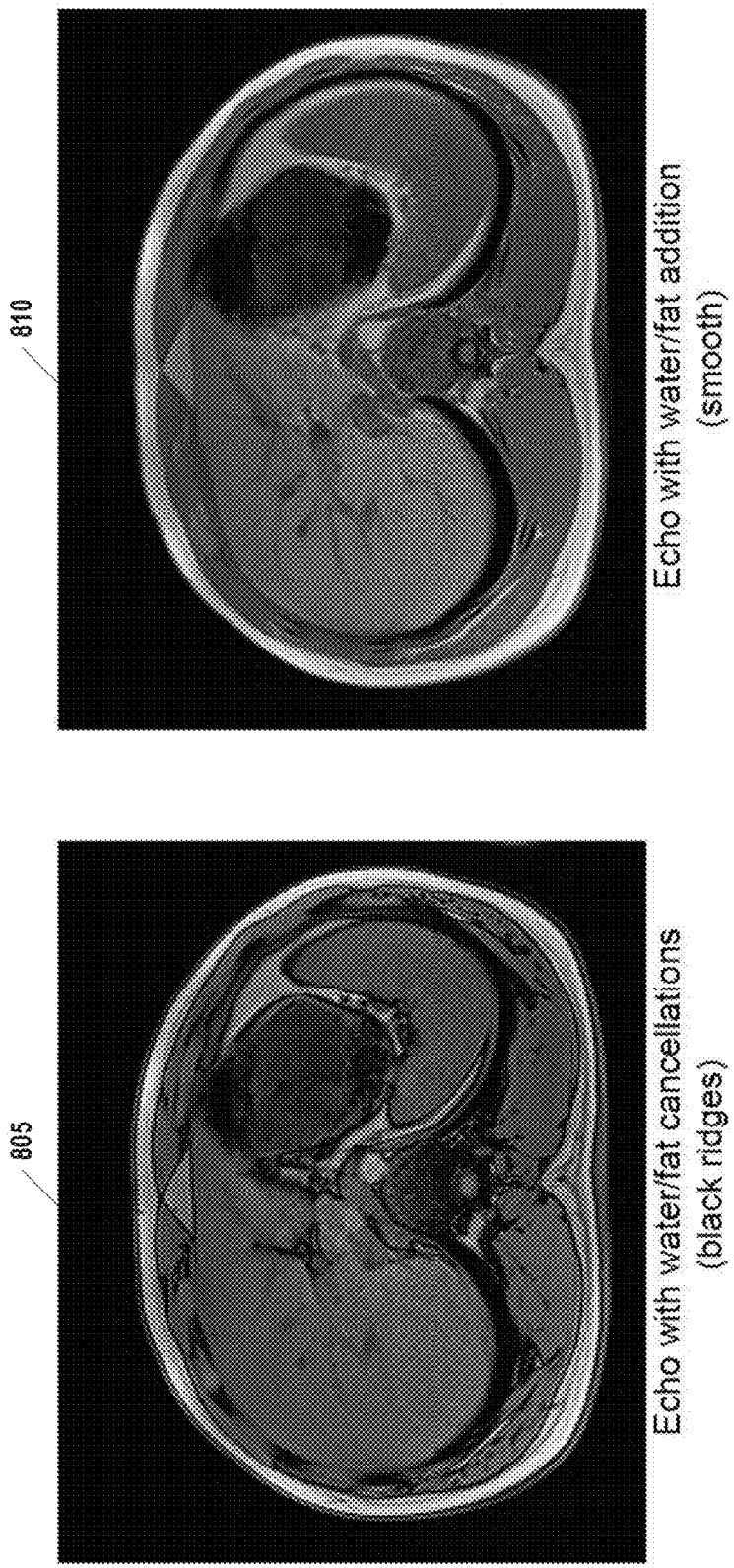
FIG. 8 shows a pair of images illustrating echo with water/fat cancellations and additions, respectively, according to some embodiments of the present invention.

The influence of the signal on noise level estimation can be further limited in multi-echo data sets by selecting smoother in-phase echoes. FIG. 8 shows a pair of images 805, 810 illustrating echo with water/fat cancellations and additions, respectively, according to some embodiments of the present invention. As shown in Image 805, echoes with water/fat cancellations result in black ridges in the image data. Conversely, in Image 810 where there are echoes with water/fat additions, the data is smooth. Thus, by only using echoes with constructive interferences between the water and fat responses for noise level estimation, the denoised images will generally be smoother since those images contain less signal in the wavelet band used to measure the noise.

Figure 9:
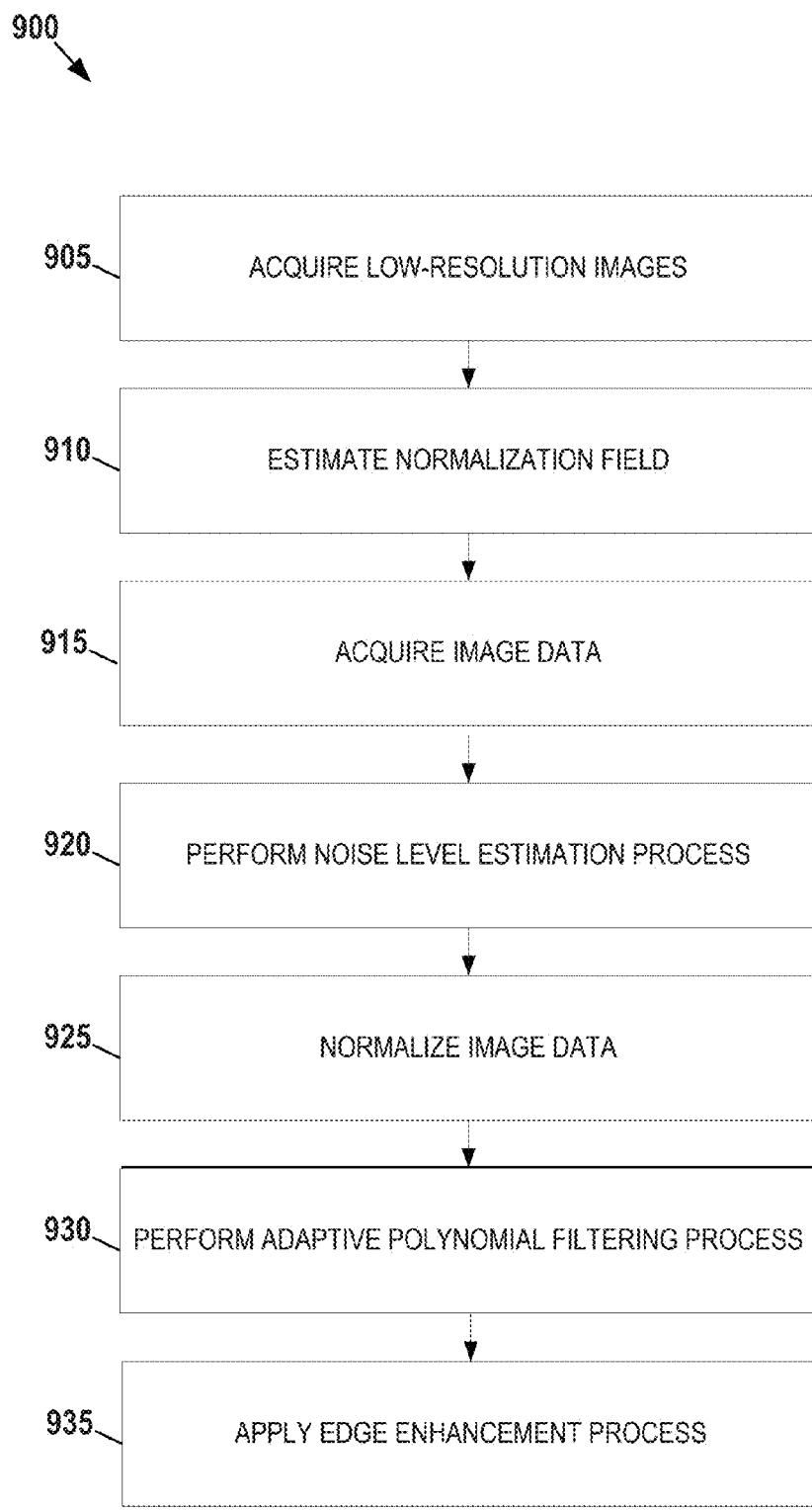
FIG. 9 provides a method for denoising magnetic resonance images, according to some embodiments of the present invention.

FIG. 9 provides a method 900 for denoising magnetic resonance images, according to some embodiments of the present invention. At 905, low-resolution images are acquired using a MRI device (see, e.g., FIG. 1). Next, at 910, these images are used to estimate a normalization field. Then, at step 915, image data is acquired from the MRI device. Then, at step 920 a noise level estimation process is performed with the image data to yield an inhomogeneous noise-level map. The implementation of the noise level estimation process can vary according to different embodiments of the present invention. For example, in some embodiments, the noise level estimation is based on the MAD estimator in the wavelet domain. In one embodiment, the noise level process is performed using a region of law signal-to-noise automatically selected using the normalization field. For example, once the region of interest is selected a high-pass filter (e.g., a HH wavelet transform) may be applied to corresponding image data in that region. The median absolute deviation of the filtered image data may then be determined which, in turn, may be scaled by noise distribution scaling factor to yield a homogeneous noise level value. The exact value of the noise distribution scaling factor may be selected based on the probability distribution of the underlying data. For example, in some embodiments, where complex data with a Gaussian distribution is processed, the scaling factor is 1.4926. Once the homogeneous noise level value has been determined, it may be used, along with the normalization field to determine the inhomogeneous noise-level map.

Returning to FIG. 9, at step 925, the normalization field (determined at step 910) is used to normalize the image data. Then, at step 930, an adaptive polynomial filtering process is performed using the normalized image data and the inhomogeneous noise-level map to yield a denoised image. In some embodiments, the adaptive polynomial filtering process may be summarized by two steps: a base filter is computed using the normalized image and the inhomogeneous noise-level map, then, this filter is iteratively applied to the normalized image to yield the denoised image. The number of iterations will depend on the design of the filter. During each iteration of the filtering, the coefficients associated with the filter will be applied to the image data. In some embodiments, the coefficients are pre-computed using a priori data to optimize denoising and edge preservation performance.

Finally, at step 935, an edge enhancement process is applied to the denoised image, using any edge enhancement technique known in the art. It should be noted that such edge enhancement is not required for readability of the image since the adaptive polynomial filtering process performed at 930 will preserve edges in the processed data. Thus, the edge enhancement process may be configured with an edge enhancement level which maximizes the perceived quality of the resulting denoised image.

Figure 10:
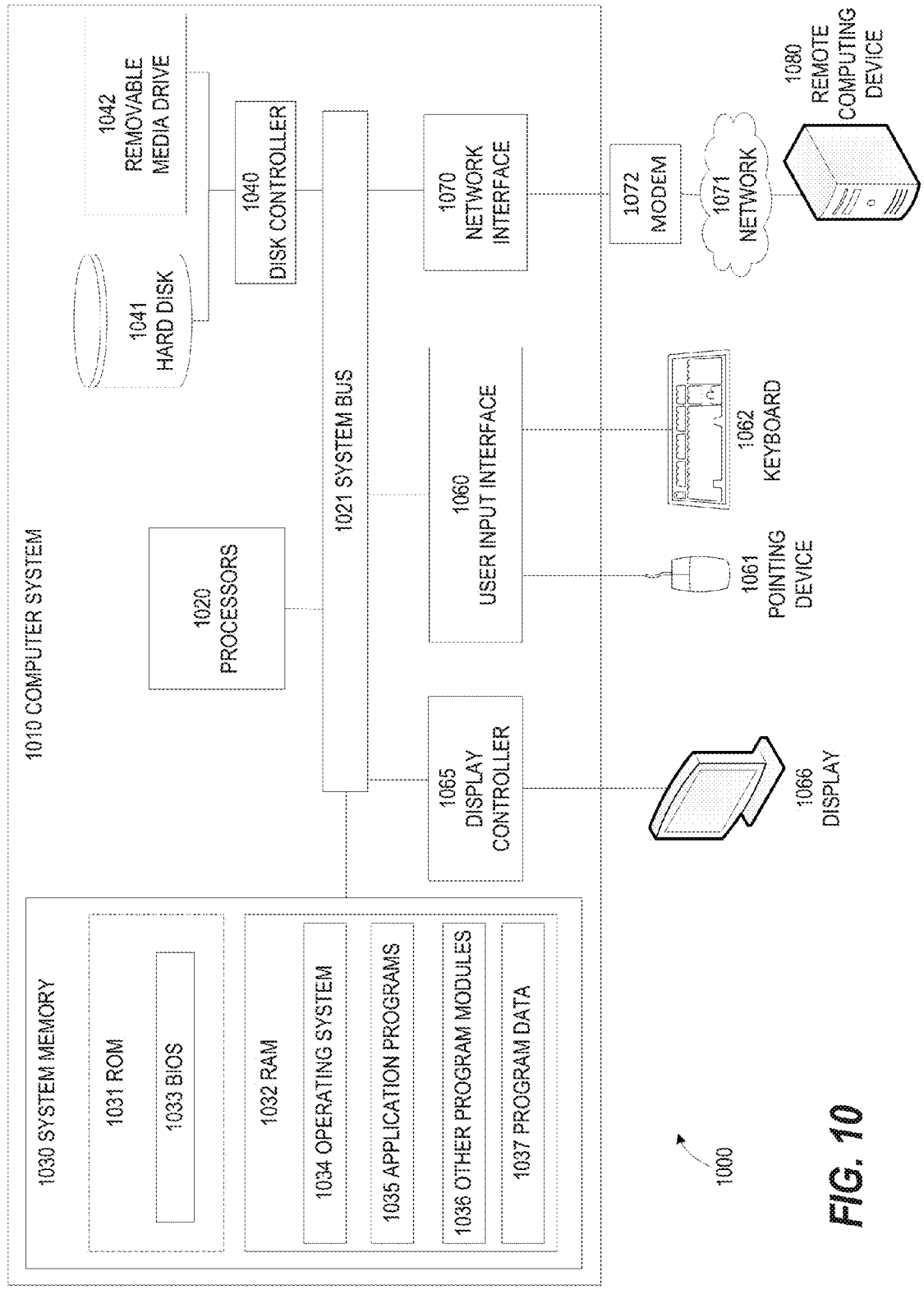
FIG. 10 illustrates an exemplary computing environment within which embodiments of the invention may be implemented.

FIG. 10 illustrates an exemplary computing environment 1000 within which embodiments of the invention may be implemented. For example, this computing environment 1000 may be used to implement the denoising method 900 described in FIG. 9. In some embodiments, the computing environment 1000 may be used to implement one or more of the components illustrated in the system 100 of FIG. 1. The computing environment 1000 may include computer system 1010, which is one example of a computing system upon which embodiments of the invention may be implemented. Computers and computing environments, such as computer system 1010 and computing environment 1000, are known to those of skill in the art and thus are described briefly here.

As shown in FIG. 10, the computer system 1010 may include a communication mechanism such as a bus 1021 or other communication mechanism for communicating information within the computer system 1010. The computer system 1010 further includes one or more processors 1020 coupled with the bus 1021 for processing the information. The processors 1020 may include one or more central processing units (CPUs), graphical processing units (GPUs), or any other processor known in the art.

The computer system 1010 also includes a system memory 1030 coupled to the bus 1021 for storing information and instructions to be executed by processors 1020. The system memory 1030 may include computer readable storage media in the form of volatile and/or nonvolatile memory, such as read only memory (ROM) 1031 and/or random access memory (RAM) 1032. The system memory RAM 1032 may include other dynamic storage device(s) (e.g., dynamic RAM, static RAM, and synchronous DRAM). The system memory ROM 1031 may include other static storage device(s) (e.g., programmable ROM, erasable PROM, and electrically erasable PROM). In addition, the system memory 1030 may be used for storing temporary variables or other intermediate information during the execution of instructions by the processors 1020. A basic input/output system 1033 (BIOS) containing the basic routines that help to transfer information between elements within computer system 1010, such as during start-up, may be stored in ROM 1031. RAM 1032 may contain data and/or program modules that are immediately accessible to and/or presently being operated on by the processors 1020. System memory 1030 may additionally include, for example, operating system 1034, application programs 1035, other program modules 1036 and program data 1037.

The computer system 1010 also includes a disk controller 1040 coupled to the bus 1021 to control one or more storage devices for storing information and instructions, such as a hard disk 1041 and a removable media drive 1042 (e.g., floppy disk drive, compact disc drive, tape drive, and/or solid state drive). The storage devices may be added to the computer system 1010 using an appropriate device interface (e.g., a small computer system interface (SCSI), integrated device electronics (IDE), Universal Serial Bus (USB), or FireWire).

The computer system 1010 may also include a display controller 1065 coupled to the bus 1021 to control a display 1066, such as a cathode ray tube (CRT) or liquid crystal display (LCD), for displaying information to a computer user. The computer system includes an input interface 1060 and one or more input devices, such as a keyboard 1062 and a pointing device 1061, for interacting with a computer user and providing information to the processor 1020. The pointing device 1061, for example, may be a mouse, a trackball, or a pointing stick for communicating direction information and command selections to the processor 1020 and for controlling cursor movement on the display 1066. The display 1066 may provide a touch screen interface which allows input to supplement or replace the communication of direction information and command selections by the pointing device 1061.

The computer system 1010 may perform a portion or all of the processing steps of embodiments of the invention in response to the processors 1020 executing one or more sequences of one or more instructions contained in a memory, such as the system memory 1030. Such instructions may be read into the system memory 1030 from another computer readable medium, such as a hard disk 1041 or a removable media drive 1042. The hard disk 1041 may contain one or more datastores and data files used by embodiments of the present invention. Datastore contents and data files may be encrypted to improve security. The processors 1020 may also be employed in a multi-processing arrangement to execute the one or more sequences of instructions contained in system memory 1030. In alternative embodiments, hard-wired circuitry may be used in place of or in combination with software instructions. Thus, embodiments are not limited to any specific combination of hardware circuitry and software.

As stated above, the computer system 1010 may include at least one computer readable medium or memory for holding instructions programmed according embodiments of the invention and for containing data structures, tables, records, or other data described herein. The term "computer readable medium" as used herein refers to any medium that participates in providing instructions to the processor 1020 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 1041 or removable media drive 1042. Non-limiting examples of volatile media include dynamic memory, such as system memory 1030. Non-limiting examples of transmission media include coaxial cables, copper wire, and fiber optics, including the wires that make up the bus 1021. Transmission media may also take the form of acoustic or light waves, such as those generated during radio wave and infrared data communications.

The computing environment 1000 may further include the computer system 1010 operating in a networked environment using logical connections to one or more remote computers, such as remote computer 1080. Remote computer 1080 may be a personal computer (laptop or desktop), a mobile device, a server, a router, a network PC, a peer device or other common network node, and typically includes many or all of the elements described above relative to computer system 1010. When used in a networking environment, computer system 1010 may include modem 1072 for establishing communications over a network 1071, such as the Internet. Modem 1072 may be connected to bus 1021 via user network interface 1070, or via another appropriate mechanism.

Network 1071 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1010 and other computers (e.g., remote computer 1080). The network 1071 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 1071.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for".

What is claimed is:

1. A method for denoising magnetic resonance images, the method comprising:
    acquiring complex image data from a magnetic resonance imaging device;
    generating an inhomogeneous noise-level map representative of an estimated noise level in the complex image data;
    using the inhomogeneous noise-level map and the complex image data to compute an adaptive denoising filter;
    iteratively applying the adaptive denoising filter to the complex image data and recombine the iterates using polynomial coefficients to yield a denoised image;
    estimating a normalization field;
    modulating the inhomogeneous noise-level map by the normalization field prior to applying the adaptive denoising filter to the complex image data;
    selecting a region of interest within the complex image data;
    applying a high-pass filter to the complex image data using the region of interest to yield filtered image data;
    determining a median absolute deviation of the filtered image data;
    applying a noise distribution scaling factor to the median absolute deviation to yield a homogeneous noise level value; and
    determining the inhomogeneous noise-level map based on the homogeneous noise level value and the normalization field.

2. The method of claim 1, wherein the region of interest is selected based on the normalization field.

3. The method of claim 2, wherein the region of interest is comprises a region of the complex image data corresponding to signal-to-noise ratio values below a threshold value.

4. The method of claim 1, wherein the complex image data comprises a multi-echo data set and the region of interest corresponds to portions of the complex image data having echoes with constructive interferences between water and fat responses.

5. The method of claim 1, wherein the adaptive denoising filter is a bilateral filter that is adaptive to local noise level.

6. The method of claim 1, further comprising:
    applying an edge enhancement process to the denoised image, wherein the edge enhancement process is configured based on a predetermined edge enhancement level tuned to maximize perceived image quality.

* * * * *